United States Patent
Hong et al.

(10) Patent No.: US 10,469,468 B2
(45) Date of Patent: Nov. 5, 2019

(54) APPARATUS AND METHOD FOR AUTOMATICALLY CONVERTING USER INTERFACE

(75) Inventors: Sang-Mo Hong, Suwon-si (KR); Yong-Soo Jung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1729 days.

(21) Appl. No.: 12/202,806

(22) Filed: Sep. 2, 2008

(65) Prior Publication Data

US 2009/0064315 A1 Mar. 5, 2009

(30) Foreign Application Priority Data

Aug. 30, 2007 (KR) .................. 10-2007-0087653

(51) Int. Cl.
| | | |
|---|---|---|
| *H04L 29/06* | (2006.01) | |
| *G06F 21/36* | (2013.01) | |
| *H04W 12/06* | (2009.01) | |

(52) U.S. Cl.
CPC .......... *H04L 63/0492* (2013.01); *G06F 21/36* (2013.01); *H04W 12/06* (2013.01)

(58) Field of Classification Search
CPC ....... H04W 12/00; H04W 12/06; G06F 21/34; G06F 2221/2111; G06F 21/30; G06F 21/44; G06F 2221/2129; G06F 21/36
(Continued)

(56) References Cited

U.S. PATENT DOCUMENTS 6,754,562 B2 * 6/2004 Strege et al. .................. 700/279
6,874,037 B1 * 3/2005 Abram et al. ................ 709/248
(Continued)

FOREIGN PATENT DOCUMENTS

| KR | 1020050017698 | 2/2005 |
|---|---|---|
| KR | 1020060082715 | 7/2006 |
| KR | 1020070037782 | 4/2007 |

OTHER PUBLICATIONS

Bluetooth SIG, Specification of the Bluetooth System, Jul. 26, 2007, 2.1 + EDR, vols. 1-4, vol. 2: pp. 441, 446, 609, 610, 613, 855, 856, vol. 3: pp. 180, 181, 193, 194, 236, 237.*

*Primary Examiner* — Tamara T Kyle
(74) *Attorney, Agent, or Firm* — The Farrell Law Firm, P.C.

(57) ABSTRACT

An apparatus and a method are provided for automatically converting a user interface (UI). A Bluetooth-automatic authentication function is performed so as to automatically convert a current set UI to a stored UI corresponding to an authenticated Bluetooth terminal. In order to automatically convert UI of a terminal which is automatically authenticated in a short communication mode, at least one terminal ID for automatic authentication and UI configuration information corresponding to the terminal ID are set. When a terminal ID for automatic authentication is searched in a short distance communicating mode, a terminal corresponding to the searched terminal ID is automatically authenticated. The present UI configuration information corresponding to the automatically authenticated terminal is automatically applied to a current terminal UI, so that a current UI such as a main screen and a main menu category can be automatically converted to a preset UI corresponding to each authenticated Bluetooth terminal.

9 Claims, 6 Drawing Sheets

(58) Field of Classification Search
USPC .......................................................... 713/169
See application file for complete search history.

(56) References Cited

U.S. PATENT DOCUMENTS

| | | | |
|---|---|---|---|
| 7,249,182 B1* | 7/2007 | Heinonen et al. ............ | 709/227 |
| 7,418,591 B2* | 8/2008 | Tachikawa .................... | 713/155 |
| 2002/0077910 A1* | 6/2002 | Shioda et al. ................. | 705/14 |
| 2003/0228842 A1* | 12/2003 | Heinonen et al. ............ | 455/41.2 |
| 2004/0003256 A1* | 1/2004 | Coffy ................. | G06Q 20/3674 |
| | | | 713/179 |
| 2005/0148360 A1* | 7/2005 | Uchiyama ................... | 455/552.1 |
| 2005/0221798 A1* | 10/2005 | Sengupta et al. ............. | 455/411 |
| 2006/0041746 A1* | 2/2006 | Kirkup et al. ................ | 713/168 |
| 2006/0085419 A1* | 4/2006 | Rosen ............................... | 707/9 |
| 2006/0199538 A1* | 9/2006 | Eisenbach ................... | 455/41.2 |
| 2006/0200596 A1* | 9/2006 | So ......................... | H04L 63/083 |
| | | | 710/38 |
| 2007/0247449 A1* | 10/2007 | Mack ...................... | G06F 3/023 |
| | | | 345/204 |
| 2007/0250591 A1* | 10/2007 | Milic-Frayling ......................... | |
| | | | H04L 29/12122 |
| | | | 709/217 |
| 2009/0207013 A1* | 8/2009 | Ayed ......................... | 340/539.1 |

* cited by examiner

APPARATUS AND METHOD FOR AUTOMATICALLY CONVERTING USER INTERFACE

PRIORITY

This application claims priority under 35 U.S.C. § 119(a) to an application entitled "Apparatus And Method For Automatically Converting User Interface" filed in the Korean Intellectual Property Office on Aug. 30, 2007 and assigned Serial No. 2007-87653, the contents of which are incorporated herein by reference.

BACKGROUND OF THE INVENTION

1. Field of the Invention

The present invention relates generally to user interfaces (UIs) of a terminal, and more particularly, to an apparatus and a method for automatically converting a UI according to a Bluetooth® (hereinafter "Bluetooth") terminal authenticated by performing a Bluetooth-automatic authentication function.

2. Description of the Related Art

In general, mobile terminals have a tendency to be frequently used due to portability. Because of this tendency, service providers (terminal manufacturers) have developed various functions of a terminal so as to secure a large number of users.

According to a Bluetooth-automatic authentication function of a terminal, one Bluetooth terminal automatically authenticates another Bluetooth terminal, which has been preset by the one Bluetooth terminal to be automatically authenticated when a Bluetooth searching mode is performed. The function automatically allots a Bluetooth channel to the other terminal, thereby communicating with the other Bluetooth terminal. According to the Bluetooth-automatic authentication function, a Bluetooth terminal automatically performs processes for connection with another Bluetooth terminal without the user's intervention so as to communicate with other Bluetooth terminals in a convenient manner.

The Bluetooth-automatic authentication function of a terminal can provide convenience to the user only in a connection between Bluetooth terminals. Therefore, there exists a need for a scheme for providing various conveniences to the user through a Bluetooth-automatic authentication function.

SUMMARY OF THE INVENTION

The present invention has been made to address at least the above problems and/or disadvantages and to provide at least the advantages described below. Accordingly, an aspect of the present invention provides an apparatus and a method for providing various conveniences to the user through a Bluetooth-automatic authentication function.

Another aspect of the present invention provides an apparatus and a method for converting UI so as to allow the user to conveniently certify information regarding a Bluetooth terminal authenticated by performing a Bluetooth-automatic authentication function.

An additional aspect of the present invention provides an apparatus and a method for converting a current main screen and a current main menu category to a main screen and a main menu category, which are in relation to a Bluetooth terminal authenticated by performing a Bluetooth-automatic authentication function, respectively.

According to one aspect of the present invention, a method is provided for automatically converting UI of a terminal. At least one terminal ID is set for automatic authentication and UI configuration information is set corresponding to the terminal ID. A terminal corresponding to the preset terminal ID for automatic authentication is automatically authenticated when the preset terminal ID is searched while a short distance communication mode is performed. A current UI is converted to a preset UI corresponding to the automatically authenticated terminal in such a manner that preset UI configuration information corresponding to the automatically authenticated terminal is automatically reflected to the current UI.

According to another aspect of the present invention, an apparatus is provided for automatically converting UI of a terminal. The apparatus includes a memory unit of storing at least one terminal ID for automatic authentication and UI configuration information corresponding to the terminal ID, and the apparatus also includes a controller, which automatically authenticates a terminal corresponding to a preset terminal ID when the preset terminal ID for automatic authentication is searched while short communication mode is performed, checks preset UI configuration information corresponding to the automatically authenticated terminal through the memory unit, automatically reflects the checked UI configuration information to a current terminal UI, and converts the current UI to the preset UI corresponding to the automatically authenticated terminal.

BRIEF DESCRIPTION OF THE DRAWINGS

The above and other aspects, features and advantages of the present invention will be more apparent from the following detailed description when taken in conjunction with the accompanying drawings, in which.

DETAILED DESCRIPTION OF PREFERRED EMBODIMENT

Figure 1:
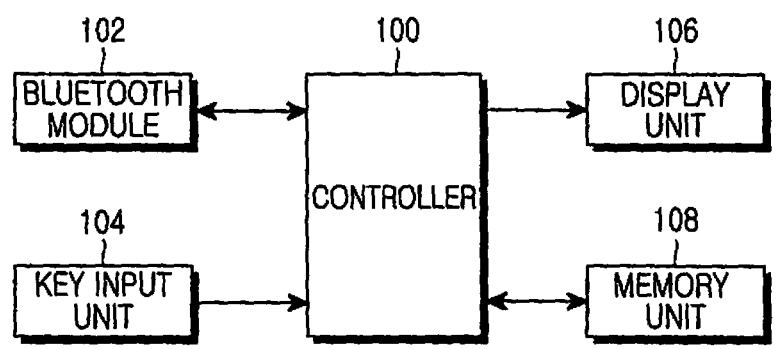
FIG. 1 is a block diagram illustrating an inner structure of a Bluetooth terminal, which performs a Bluetooth automatic authentication function and automatically converts a UI depending on an automatically authenticated Bluetooth terminal according to an embodiment of the present invention.

Preferred embodiments of the present invention are described in detail with reference to the accompanying drawings. Similar components are designated by similar reference numerals although they are illustrated in different drawings. Detailed descriptions of constructions or processes known in the art may be omitted to avoid obscuring the subject matter of the present invention.

The present invention provides a method for automatically converting a UI of a current terminal to a preset UI of each automatically authenticated Bluetooth terminal, in addition to a Bluetooth-automatic authentication function. In order to achieve this, according to an embodiment of the present invention, when a Bluetooth terminal to be automatically authenticated is set, the ID of the terminal and UI, to which the user wants to convert the current UI when the terminal of the ID is automatically authenticated, are preset. A Bluetooth-automatic authentication function is performed by the terminal, which has been preset to be automatically authenticated, and simultaneously, the current UI is automatically converted to the preset UI. Also, according to an embodiment of the present invention, a Bluetooth terminal is described, but it is possible to apply the present invention to any terminal having a short-distance communication module.

With reference to FIG. 1, an inner structure of a Bluetooth terminal according to an embodiment of the present invention will be described. As shown in FIG. 1, the Bluetooth terminal according to an embodiment of the present invention includes a controller 100, a Bluetooth module 102, a key input unit 104, a display unit 106, and a memory unit 108.

The controller 100 performs an overall controlling operation of a mobile communication terminal, such as a wireless call or a data process of a typical mobile communication terminal. Also, according to an embodiment of the present invention, the controller 100 stores terminal ID for Bluetooth-automatic authentication and UI configuration information in the memory unit 108, which are inputted by the user through the key input unit 104. Also, when the preset terminal ID for automatic authentication is searched when a short distance communicating mode is performed, the controller 100 automatically authenticates a terminal corresponding to the terminal ID and reflects the preset UI configuration information corresponding to the automatically authenticated terminal to a UI of the terminal.

Also, the Bluetooth module 102 forms a wireless Bluetooth connection with another Bluetooth module so as to perform short distance communication.

The key input unit 104 includes a plurality of numeric keys and function keys, and outputs input data corresponding to a key selected by the user to the controller 100. Such a key input unit 104 may be a typical key matrix or a typical touch screen. In a case where the key input unit 104 is a touch screen, it is possible to select or input a plurality of numeric keys, function keys, direction keys, etc., which are displayed on the touch screen, by an instrument such as a stylus pen, etc.

Under the control of the controller 100, the display unit 106 receives display data regarding key input data inputted through the controller 100 so as to display the data, or display an operational state of the Bluetooth terminal and a plurality of pieces of information as an icon and text. Also, under the control of the controller 100, the display unit 106 visibly displays the operational state so as to allow the user to recognize when he/she sets or operates a required function. Accordingly, under the control of the controller 100, as the Bluetooth terminal, which has been preset to be automatically authenticated, is automatically authenticated, the display unit 106 according to an embodiment of the present invention displays a main screen or a main menu category, which corresponds to the Bluetooth terminal. Such a display unit 106 may be a liquid crystal display (LCD), a thin film transistor (TFT), an organic electroluminescence (EL), etc.

The memory unit 108 is constituted of a read only memory (ROM), random access memory (RAM), etc., which are used for storing a plurality of programs and information required for controlling operation of a Bluetooth terminal. Also, according to an embodiment of the present invention, after Bluetooth terminals are searched according to a Bluetooth service request, each terminal ID for automatic authentication of the searched terminals and UI configuration information corresponding to the terminal ID is stored in the memory unit 108. At this time, the terminal ID for Bluetooth automatic authentication and the UI configuration information corresponding to the terminal ID may be stored as a data table 410 shown in FIG. 3. Also, at this time, the UI configuration information may be information such as main screen information or main menu category information.

According to an embodiment of the present invention, main screen information and main menu category information are described as an example of UI configuration information, and when a predetermined Bluetooth terminal is automatically authenticated, a current UI is converted to a preset main screen and a preset main menu screen category respective to the automatically authenticated Bluetooth terminal. It is also possible to set information regarding a reception bell, conversion between bell/vibration, etc., as UI configuration information. Therefore, when a predetermined Bluetooth terminal is automatically authenticated, a current reception bell can be converted to the preset reception bell, or a reception and alarm sound, which has been set as a bell, can be converted to vibrations respective to the automatically authenticated terminal.

Then, when a Bluetooth terminal, which has been preset to be automatically authenticated, is searched in a Bluetooth searching mode according to an embodiment of the present invention, under the control of the controller 100 of the Bluetooth terminal having a structure shown in FIG. 1, a current UI of the Bluetooth terminal is converted to a UI, which has been preset therein, while the searched Bluetooth terminal, which has been set to be automatically authenticated, is automatically authenticated. The procedure of the controller 100 is described with reference to FIGS. 2A and 2B.

Figure 2A:
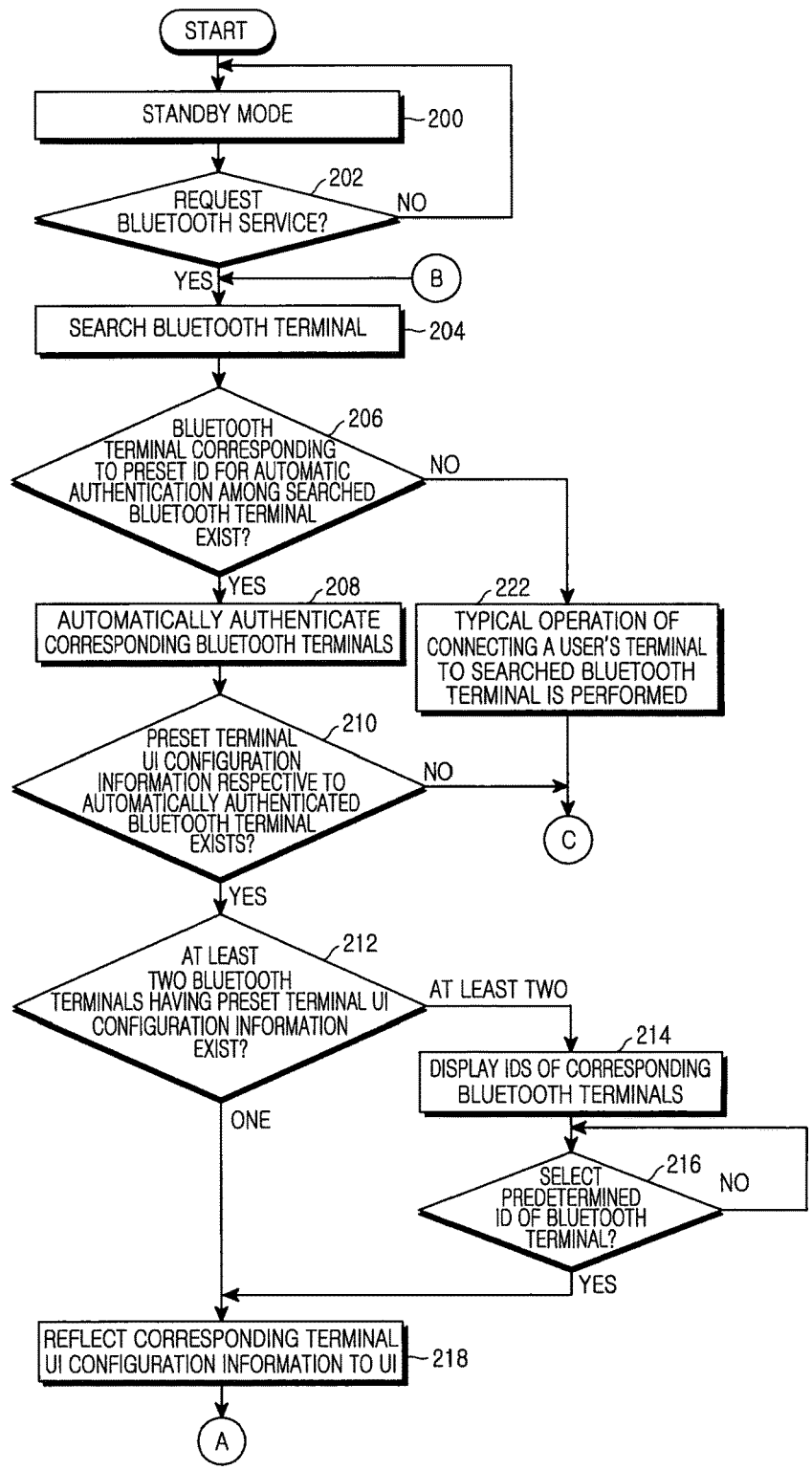
FIGS. 2A and 2B are flow charts illustrating a controlling operation of automatically converting a UI depending on a Bluetooth terminal automatically authenticated by performing a Bluetooth automatic authentication function according to an embodiment of the present invention.

As shown in FIG. 2A, the controller 100 maintains the standby state in step 200 and determines whether there is a request for a Bluetooth service in step 202. If a Bluetooth service is not requested the methodology returns to step 200 and maintains the standby state. If a Bluetooth service is requested through the key input unit 104 in step 202, the controller 100 proceeds to step 204 and searches Bluetooth terminals.

The controller 100 then checks if a Bluetooth terminal corresponding to an ID, which has been set for automatic authentication, exists among the Bluetooth terminals searched in step 206. If a Bluetooth terminal corresponding to the terminal ID, which has been set for automatic authentication, exists among the searched Bluetooth terminals, the controller 100 proceeds to step 208. If it doesn't exist, the controller 100 performs a typical connecting operation so as to connect with the Bluetooth terminal searched in step 222.

If the controller 100 proceeds from step 206 to step 208, the controller 100 automatically authenticates Bluetooth terminals which have been set for automatic authentication. At this time, the user may be notified that the Bluetooth terminals are automatically authenticated. For example, the user may be notified by means of vibration that the authentication process has proceeded. Then, the controller 100 proceeds to step 210 and determines whether preset terminal UI configuration information regarding the automatically authenticated Bluetooth terminal exists.

If there is preset terminal UI configuration information about the automatically authenticated Bluetooth terminal, the controller proceeds to step 212. If not, the controller proceeds to (C) and proceeds to step 224 of FIG. 2B to determine whether there is a Bluetooth service ending request. If there is Bluetooth service ending request, the controller ends Bluetooth service. If not, the controller proceeds to (B) and returns to step 204 of FIG. 2A.

Meanwhile, the controller 100, which has proceeded from step 210 to step 212, determines whether the number of Bluetooth terminals having set terminal UI configuration information is at least two.

If there are at least two automatically authenticated Bluetooth terminals, and all of them have UI configuration information for conversion of UI, the controller proceeds to step 214 and displays IDs of corresponding Bluetooth terminals through the display unit 106. That is, if the number of automatically authenticated Bluetooth terminals is two, both of them have UI configuration information for conversion of the UI, it is impossible to simultaneously convert a current UI to two kinds of UI corresponding to the Bluetooth terminals. Therefore, the controller allows the user to select a UI corresponding to a desired Bluetooth terminal. Thereafter, the controller 100 determines if a predetermined Bluetooth terminal ID among the Bluetooth terminal IDs displayed on the display unit 106 is selected by a user in step 216. If the predetermined Bluetooth terminal ID is selected, the controller proceeds to step 218 so as to reflect UI configuration information of the selected Bluetooth terminal to the current terminal UI, and then proceeds to (A). After checking stored UI configuration information corresponding to the selected Bluetooth terminal ID through the memory unit 108, the controller 100 reflects the checked UI configuration information to the current terminal UI. That is, by reflecting the UI configuration information of the selected Bluetooth terminal to the current terminal UI, the controller converts the current terminal UI to the UI corresponding to the selected Bluetooth terminal.

Also, if the number of automatically authenticated Bluetooth terminals is one, the controller proceeds to step 218 so as to check UI configuration information about a corresponding Bluetooth terminal through the memory unit 108. Afterward, the controller reflects the checked UI configuration information to the current terminal UI and proceeds to (A).

Figure 2B:
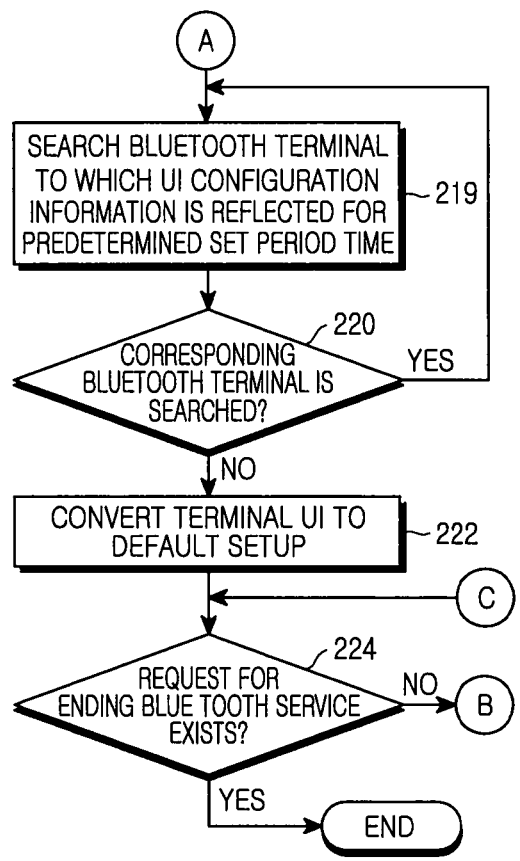

Procedures after proceeding to (A) are described with reference to FIG. 2B. The controller 100, which has proceeded from step 218 to step 219, searches a Bluetooth terminal, to which UI configuration information is reflected, for a predetermined time period. Then, the controller 100 proceeds to step 220 so as to check if a corresponding Bluetooth terminal is searched. If the Bluetooth terminal, to which the UI configuration information has been reflected, is continuously searched, the controller 100 maintains the current UI.

However, if the Bluetooth terminal, to which the UI configuration information has been reflected, isn't continuously searched, the controller proceeds to step 222 and converts the current terminal UI to a default setup. At this time, a default setup may be original UI before the UI is converted. That is, if an automatic authenticated Bluetooth terminal isn't searched, the UI is converted to the original UI based on the current terminal UI configuration information. That is, the controller periodically checks if a communicating connection with the Bluetooth terminal, to which the UI configuration information has been reflected, is cut off. If the communicating connection is cut off, the controller proceeds to step 222 and returns to the original UI before conversion.

The controller 100 then continues through step 224 as described above before terminating the methodology.

Next, the configuration of a UI automatically converted in the operation process, described above, will be described in detail. The UI, which can be automatically set, is achieved by performing whole various supplementary functions of the terminal, such as displaying a main screen, displaying a main category, selecting a bell/vibration, playing a bell sound, playing an MP3, and playing moving pictures. The present invention focuses on a function for displaying and operating a desired menu in a desired manner, among various supplementary functions of the terminal.

A UI, which is automatically converted, can be achieved by three kinds of methods. In a first method the user directly sets a UI by using the setting function of the terminal. By using the setting function of the terminal, a user can set a main screen to be applied immediately after a terminal-automatic authentication process is finished. Moreover, desired menu lists without distinction between high rank categories and low rank categories can be set according to a desired sequence in a main menu category. Further, it is possible to set selection of MP3 music as well as a bell sound, playing moving pictures, etc. in a desired manner. In other words, immediately after the Bluetooth-automatic authentication process is finished, the entire configuration of the terminal is converted to a state that the user has preset.

In a second method, a communication service provider may hold various kinds of UI configurations according to various situations in advance and may preset one UI configuration through a setting process so as to apply it. The whole UI configuration of the terminal is converted according to this preset UI configuration immediately after Bluetooth terminal-automatic authentication process is finished. The communication service provider has a separate server so that various situations are expected, which the user will experience, and UI configuration information corresponding to the expected various situations is provided within the server. The user applies this UI configuration information to the user's terminal through downloading it, and constructs detailed contents so as to configure the automatically converted UI.

In a third method, a separate software program allows UI configuration information to be set through a PC if a terminal is connected to the PC. If the user connects the terminal to the PC through a USB or other data cable and executes a setting program, the user can receive UI configuration information of the terminal from the PC, display it, convert current UI configuration information to the received UI configuration information according to the user's desire, and store it.

The UI configuration, which is automatically converted, is described in further detail. The main screen allows the user to perform all functions, which are currently implemented in setting the automatic conversion. For example, the user can configure their own main screen in such a manner that the user uses all kinds of image media, such as a photograph, a drawing, a moving picture, etc., and directly modifies and decorates a specific picture or a specific image. The user can directly configure desired construction of categories respective to the main menu using all categories in an equal level while ignoring currently configured high and low categories. Also, for menu items, such as weather forecast information, traffic information, and local information, which require wireless Internet access so as to download information, a route, through which the user accesses a server providing corresponding information, is previously stored. This storage allows the user to search information from high categories to low categories one by one. In the entertainment function, each function of an MP3, a moving picture, a camera, a game, etc. can be promoted to the highest category within the main menu category according to a necessity. Such an entertainment function is positioned within the category according to the user's set when it is automatically converted. The position of an individual entertainment function, and not a group of individual entertainment functions, moves within the category. For example, if it is assumed that a user is a User Created Content (UCC) member, the user wants to show moving pictures, which he/she has directly taken using a cellular phone, to other members, and relatively, his/her interest in a game, an MP3, etc. decreases. Moreover, a moving picture file controlling operation can be divided into the operation of controlling moving picture files shared with UCC members and the operation of controlling moving picture files only for the user. If such a series of operations is briefly set whenever the user takes each moving picture, the user can conveniently and rapidly find desired moving pictures so as to use them when the user attends a UCC club meeting.

As such, a UI, which is automatically converted, does not have a specific category and a simple characteristic, but has a main function allowing the user to perform functions of the terminal as rapidly and conveniently as possible in a specific situation.

Figure 3:
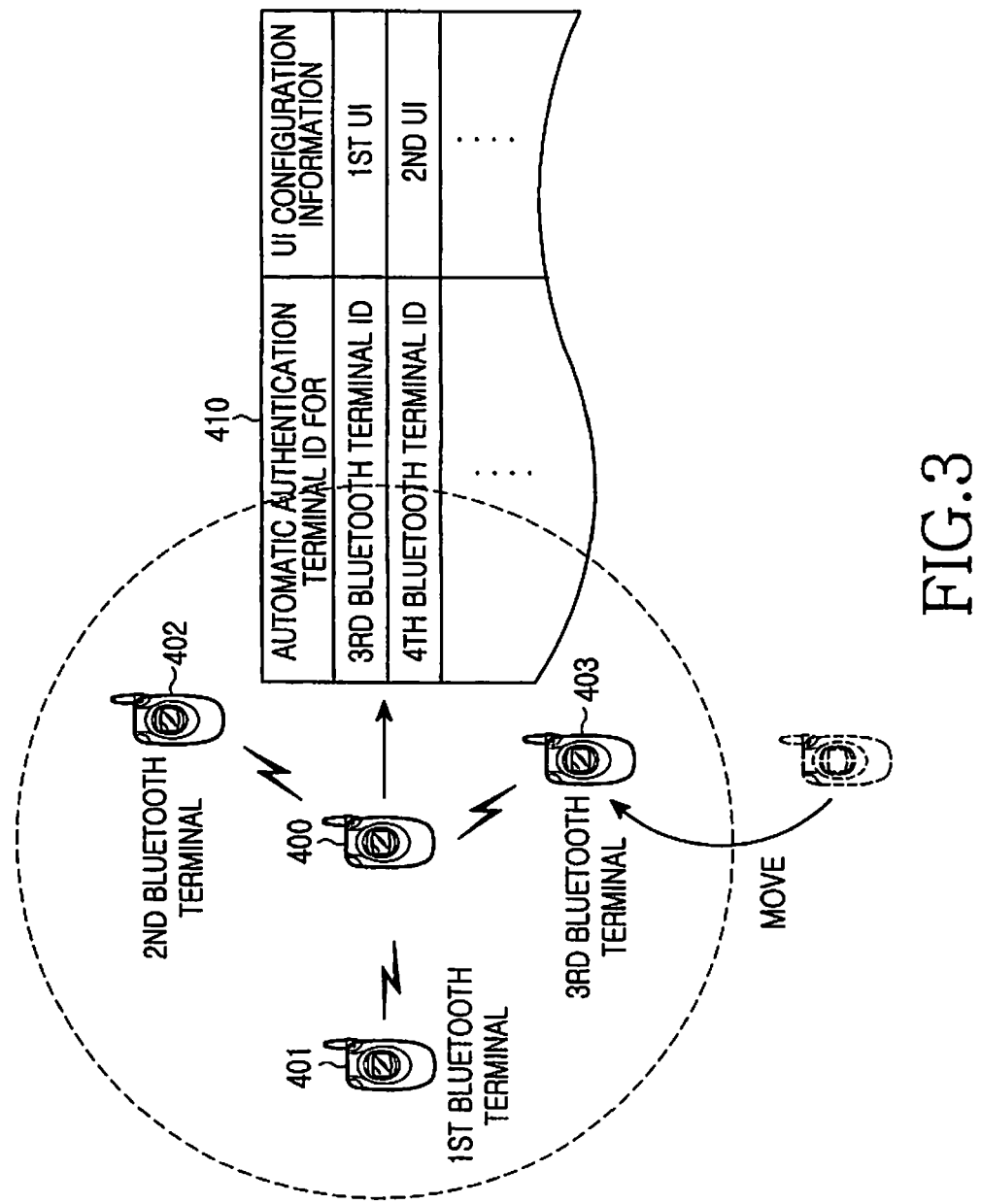
FIG. 3 is a diagram illustrating an operation of automatically authenticating a previously registered Bluetooth terminal by a Bluetooth terminal according to an embodiment of the present invention.
Figure 4A:
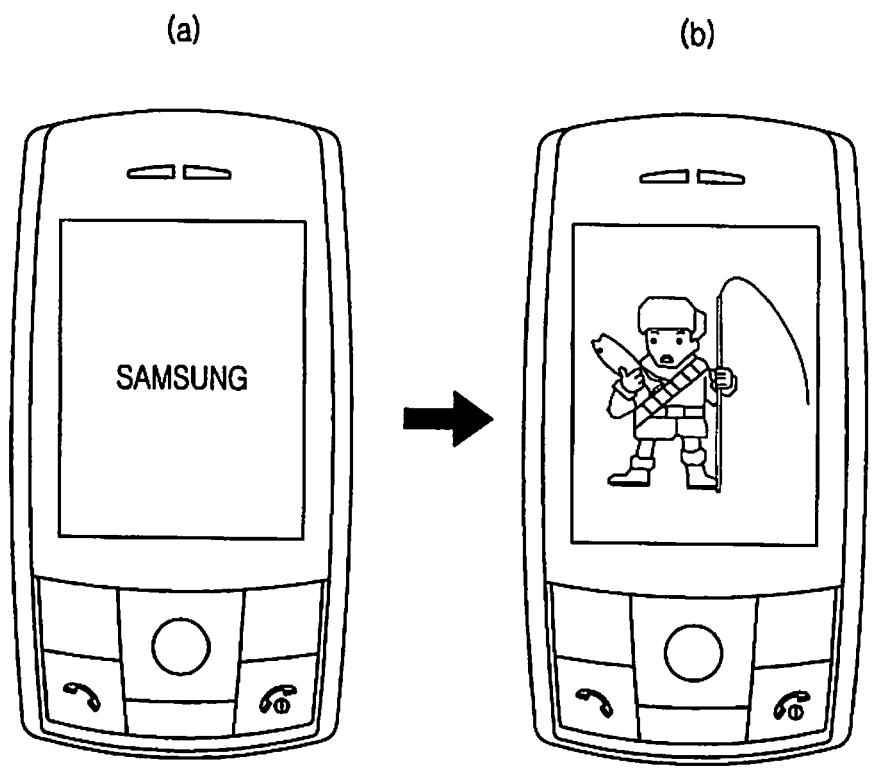
FIGS. 4A and 4B are diagrams illustrating plane views of screens of a Bluetooth terminal, in which a user interface is converted depending on a Bluetooth terminal automatically authenticated according to an embodiment of the present invention.
Figure 4B:
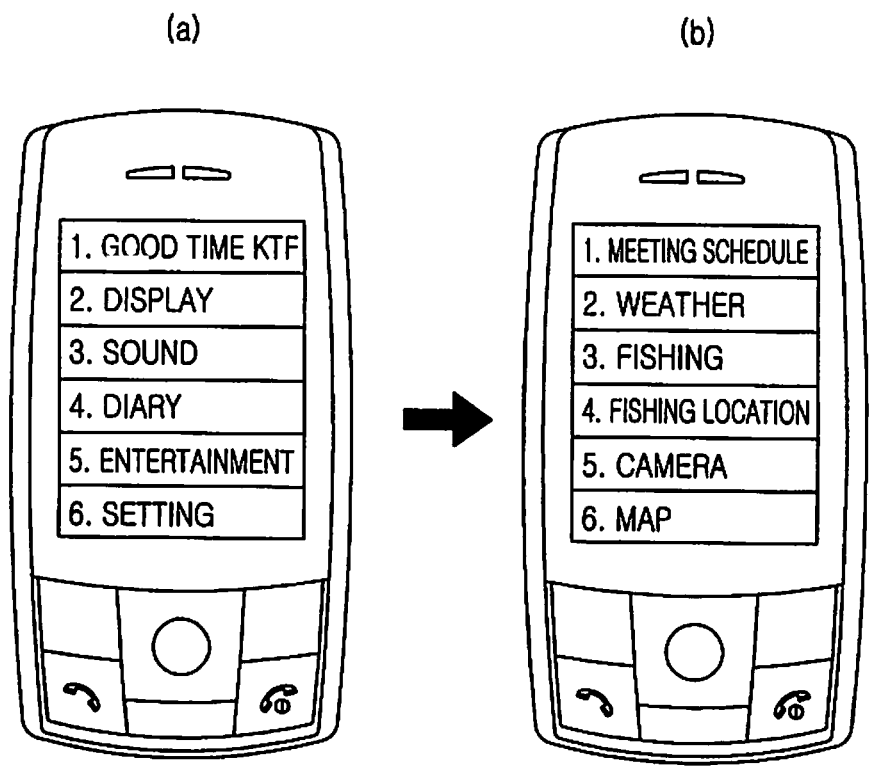

For example, with reference to FIGS. 3, 4A and 4B, it is assumed that the user of a Bluetooth terminal is a fishing club member. Also, it is assumed that a terminal 400 of FIG. 3 is a Bluetooth terminal of the user, and a third Bluetooth terminal 403 is a terminal of a fishing club member A. Also, it is assumed that the user sets Bluetooth terminal IDs of fishing club members as IDs of Bluetooth terminals which can automatically authenticated in his/her own Bluetooth terminal 400, and sets UI configuration information corresponding to each Bluetooth terminal IDs. For example, as shown in data table 410, it is assumed that the user sets the ID of the terminal 403 of the fishing club member A as an ID of a terminal to be automatically authenticated, and previously stores a data table where UI configuration information corresponding to the ID of the terminal 403 is set as a first UI. Also, it is assumed that a first UI includes a main screen and main menu category information. As a main screen, a photo image is shown in (b) of FIG. 4A, which shows the smiling user with a 40 cm bass caught during last fishing club activity, and a category shown in (b) of FIG. 4B is set as the main menu category.

Also, it is assumed that the user moves to an appointed place for a meeting of the fishing club on the appointed day, and the user sets a Bluetooth terminal service function in his/her own Bluetooth terminal. It is also assumed that the user has arrived at the appointed place first and is waiting for other fishing club members.

Then, if the third Bluetooth terminal 403 of the fishing club member A is located with the distance of several tens of meters away from the appointed place and enters an area having a distance where the Bluetooth searching can be performed, the user Bluetooth terminal detects the preset third Bluetooth terminal 403 so as to notify the fact that an automatic authentication procedure are proceeded to the user by means of vibration. As such, after the automatic authentication procedure proceeds, the user Bluetooth terminal 400 converts a current main screen shown in (a) of FIG. 4a, which is displayed on the Bluetooth terminal, to a main screen shown in (b) of FIG. 4A. Also, the Bluetooth terminal 400 converts a current main menu category shown in (a) of FIG. 4B, which is displayed on the Bluetooth terminal, to a main menu category shown in (b) of FIG. 4B.

As such, the current main screen and the current menu category are converted to the main screen and the main menu category, which relate to the fishing club, respectively, so that a menu, which allows the user to rapidly search information regarding the fishing club so as to share them with other members, is displayed as a main menu. Therefore, the user can check desired information in more rapid and convenient manner. For example, in the fishing club meeting, the user can play an important role in determining the next fishing place and next schedule through a menu '1. Meeting schedule,' '2. Weatherinformation,' and '3. Fishing information' among the converted main menu categories. Also, after the dinner meeting, the user can rapidly check pictures taken during a fishing activity together with other members by immediately selecting a '5. Camera' menu. The user can share tackle information required for purchasing equipment with other members through a '4. Tackle information' menu. That is, menus in relation to the fishing club members can be set as the main menu. There is a method for setting the main menu category in which the user can select desired menus among menus included in the terminal so as to set the selected menus into a main menu category when the terminal is manufactured. Also, as shown in (b) of FIG. 4B, in a case of a menu item, such as '1. Meeting schedule,' 'Weather information', 'Tackle information' and 'Map,' which has to be downloaded through wireless Internet access, the user can directly input content of the menu item and preset a server route to be provided when the user selects the menu item.

For example, in order to set the menu item such as 'weather information' as a main menu category, the user selects a menu for setting a main menu category. Such a menu for setting a main menu category may be '1. Main menu item input' and '2. Main menu information offering address setting.'

The user selects '1. Main menu item input', directly inputs 'Weather information' as a menu item which the user wants to set, and stores it.

When the user selects '2. Main menu information offering address setting,' main items, addresses of which can be set, can be displayed. For example, if each of 'Weather information' item, 'Meeting schedule' item, and 'Map' items has been inputted and stored by inputting '1. Main menu item input', these three items can be displayed by selecting '2. Main menu information offering address setting' item.

As described above, in a state where three items are displayed, if the user selects a predetermined menu item, an address of which the user wants to set, e.g. 'Weather information' item, a current screen is converted to a screen for setting the address so that the user can directly input the address. Also, in a state where the user executes an Internet network through a terminal and accesses an Internet site for providing weather information, and the Internet site is displayed on the screen, if the user performs an input operation of setting an address of the Internet site, the terminal can automatically set the address of the Internet site providing the weather information, which the user accesses, in such a manner that it corresponds to the 'Weather information' item.

Also, in a case where, because the user moves away from other members while the user is on their way home after finishing the club meeting, connection between the user's Bluetooth terminal and the third Bluetooth terminal 403 is cut off within a search available distance, the screen of the user's terminal can return to the main screen shown in (a) of FIG. 4A and to the main menu category shown in (b) of FIG. 4B, which has been previously set.

As described above, according to the present invention, a Bluetooth terminal performs an automatic authentication respective to a pre-registered terminal ID for automatic authentication within a Bluetooth search available distance. If IU configuration information, such as a main screen and a main menu category, corresponding to an automatic authentication-registered terminal has been set, the Bluetooth terminal converts a current main screen and a current main menu category to the set main screen and the set main menu category, which correspond to the automatic authentication-registered terminal, respectively. Also, when a Bluetooth terminal, which has UI configuration information reflected to the current UI, deviates from a search available distance so that communicating connection between the Bluetooth terminal and the user' Bluetooth terminal is cut off, a current main screen and a current main menu category of the use's Bluetooth terminal return to an original main menu and an original main menu category, respectively.

As described above, according to the present invention, a user's terminal is set to automatically authenticate a Bluetooth terminal of a member of a club, in which a user is included, or a person relating to the user, and sets a UI, to which the user wants to convert a current UI, when the corresponding Bluetooth terminal is authenticated. Then, it is possible to perform a Bluetooth-automatic authentication function so as to convert the current UI to the preset UI respective to the authenticated Bluetooth terminal.

As such, in a case where the user is located within a short communication available distance so as to attend a meeting of a club, members of which share in a common interest or in a case where a specific person relating to the user is located within a short communication available distance, the UI of the user's terminal, such as a main screen or a main menu category, can be automatically converted to a UI corresponding to the specific club or to a UI corresponding to the specific person.

Also, when the main menu category is changed by automatically authenticating the Bluetooth terminal of the specific member of the club or the specific person relating to the user, the user can check information regarding the person operating the authenticated Bluetooth terminal in a more rapid and convenient manner.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for displaying a user interface (UI) of a first mobile terminal, the method comprising the steps of:
   displaying, on a display of the first mobile terminal, a first UI mapped to the first mobile terminal;
   if a second mobile terminal entering within a predetermined range of the first mobile terminal and capable of performing a short-distance communication with the first mobile terminal is detected, determining whether a terminal ID of the second mobile terminal is one from among pre-stored terminal IDs of one or more mobile terminals in the first mobile terminal; and
   if the terminal ID of the second mobile terminal is one from among the pre-stored terminal IDs:
      determining UI configuration information mapped to the second mobile terminal;
      determining whether the display of the first mobile terminal currently displays a main image screen of the first UI having a main image, or a menu screen of the first UI having menu categories;
      displaying, on the display of the first mobile terminal, a main image screen of a second UI configured based on the UI configuration information, when it is determined that the display currently displays the main image screen of the first UI;
      displaying, on the display of the first mobile terminal, a menu screen of the second UI when it is determined that the display currently displays the menu screen of the first UI,
   wherein the second UI is displayed on the display of the first mobile terminal while a connection between the first mobile terminal and the second mobile terminal is maintained.

2. The method of claim 1, further comprising:
   determining whether the connection between the first mobile terminal and the second mobile terminal is cut off for a predetermined time period; and
   if the connection between the first mobile terminal and the second mobile terminal is cut off for the predetermined time period, changing the second UI to the first UI.

3. The method of claim 1, further comprising:
   if the terminal ID of the second mobile terminal is one from among the pre-stored terminal IDs, notifying a user of the first mobile terminal that authentication for the second mobile terminal succeeded.

4. The method of claim 1, further comprising:
   if two or more mobile terminals are detected, displaying terminal IDs of mobile terminals having UI configuration information, pre-stored in the first mobile terminal, mapped to a corresponding mobile terminal, from among terminal IDs corresponding to each of the two for more mobile terminal;
   in response to selecting one of the terminal IDs, generating a third UI by changing a UI currently displayed on the display of the first mobile terminal based on UI configuration of a mobile terminal having the selected terminal ID; and
   displaying the third UI.

5. A first mobile terminal for displaying a user interface (UI), the first mobile terminal comprising:
   a display; and
   a controller configured to:
      control the display to display a first UI mapped to the first mobile terminal,
      if a second mobile terminal entering within a predetermined range of the first mobile terminal and capable of performing a short-distance communication with the first mobile terminal is detected, determine whether a terminal ID of the second mobile terminal is one from among pre-stored terminal IDs of one or more mobile terminals in the first mobile terminal, and
      if the terminal ID of the second mobile terminal is one from among the pre-stored terminal IDs:
         determine UI configuration information mapped to the second mobile terminal,
         determine whether the display currently displays a main image screen having a main image, or a menu screen having menu categories,
         control the display to display a main image screen of a second UI configured based on the UI configuration information, when it is determined that the display currently displays the main image screen of the first UI, and control the display to display a menu screen of the second UI, when it is determined that the display currently displays the menu screen of the first UI, wherein the second UI is displayed on the display of the first mobile terminal while a connection between the first mobile terminal and the second mobile terminal is maintained.

6. The first mobile terminal of claim 5, wherein the controller is further configured to:

determine whether the connection between the first mobile terminal and the second mobile terminal for a predetermined time period is cut off, and if the connection between the first mobile terminal and the second mobile terminal is cut off for the predetermined time period, change the second UI to the first UI.

7. The first mobile terminal of claim 5, wherein the controller is further configured to:

if the terminal ID of the second mobile terminal is one from among the pre-stored terminal IDs, notify a user of the first mobile terminal that authentication for the second mobile terminal succeeded.

8. The first mobile terminal of claim 5, wherein the controller is further configured to:

if two or more mobile terminals are detected, control the display to display the terminal IDs of mobile terminals having UI configuration information, pre-stored in the first mobile terminal, mapped to a corresponding mobile terminal, from among terminal IDs corresponding to each of the two or more terminals, in response to selecting one of the terminal IDs, generate a third UI by changing a UI currently displayed on the display of the first mobile terminal based on UI configuration of a mobile terminal having the selected terminal ID, and control the display to display the third UI.

9. The method of claim 1, wherein the UI configuration information is set by a user of the first mobile terminal, a communication service provider, or a separate software program.

* * * * *